(12) United States Patent
Bartasevich, Jr. et al.

(10) Patent No.: US 7,152,751 B2
(45) Date of Patent: Dec. 26, 2006

(54) LIGHTWEIGHT SHIPPING CONTAINER

(76) Inventors: William E. Bartasevich, Jr., 1675 E. Main St., #221, Kent, OH (US) 44240; John Parnall, 13146 Midlothian Tpke., #222, Midlothian, VA (US) 23113

( * ) Notice: Subject to any disclaimer, the term of this patent is extended or adjusted under 35 U.S.C. 154(b) by 101 days.

(21) Appl. No.: 10/321,882

(22) Filed: Dec. 17, 2002

(65) Prior Publication Data

US 2004/0112895 A1 Jun. 17, 2004

(51) Int. Cl.
*B65D 6/18* (2006.01)
(52) U.S. Cl. .......................................................... 220/6
(58) Field of Classification Search ................ 220/1.5, 220/6, 7, 9.1, 9.2, 9.3, 493, 607, 676
See application file for complete search history.

(56) References Cited

U.S. PATENT DOCUMENTS

| | | | |
|---|---|---|---|
| 3,233,644 A | 2/1966 | Bono | |
| 3,358,725 A | 12/1967 | Bussard et al. | |
| 4,220,119 A * | 9/1980 | Albright | 119/497 |
| 4,338,731 A * | 7/1982 | Shames et al. | 34/82 |
| 4,967,516 A * | 11/1990 | Hoshino et al. | 451/359 |
| 4,998,637 A | 3/1991 | Marovskis | |
| 5,076,457 A | 12/1991 | Marovskis | |
| 5,395,682 A | 3/1995 | Holland et al. | |
| 5,417,906 A * | 5/1995 | Chiodo | 264/153 |
| 5,515,987 A * | 5/1996 | Jacques et al. | 220/6 |
| 5,766,472 A * | 6/1998 | Tzakis | 210/485 |
| 5,941,405 A | 8/1999 | Scales | |
| 5,960,744 A * | 10/1999 | Rutman | 119/473 |
| 6,105,654 A * | 8/2000 | Martel | 160/135 |
| 2002/0078901 A1* | 6/2002 | Roberts | 119/453 |

* cited by examiner

*Primary Examiner*—Stephen Castellano
(74) *Attorney, Agent, or Firm*—John H. Thomas, P.C.

(57) ABSTRACT

A shipping container following the teachings of the present invention is made by an insert molding process. The walls and bottom are each formed with structural portions that form a frame and any necessary cross bracing. A fabric covers any opening between structural portions. The fabric is placed in a mold that defines a cavity shaped like the structural portions, and thereafter a thermoplastic resin in injected. The resin intimately penetrates the fabric fibers to hold the fabric in place. The fabric may have holes formed in it to enhance the penetration of the resin. A wide variety of fabric and resins may be used.

10 Claims, 4 Drawing Sheets

LIGHTWEIGHT SHIPPING CONTAINER

FIELD OF THE INVENTION

The present invention relates to improved, lightweight shipping containers.

BACKGROUND OF THE INVENTION

Shipping containers are used to ship a wide variety of goods. One type of shipper forms a box that can be knocked down after use and then reused. This kind of container should be strong enough to carry its intended load safely and be as light as possible to reduce unnecessary shipping costs. It should also fold as compactly as possible to make return handling convenient.

One shipper of this kind is shown in U.S. Pat. No. 4,998,637. This patent shows a collapsible carton with a bottom and four sidewalls. The four sidewalls are hinged to the base and fold outwardly, forming a cross shape when knocked down. A separate top is used to position the walls when the carton is erect, and a disposable band holds the carton erect. This shipper is made of a single material.

Shipping crates have been made by, for example, using ribs to make the walls stiff, using thin cross sections elsewhere, and making openings through walls, all to make the resulting shipper lightweight. These techniques are illustrated in U.S. Pat. No. 5,076,457.

Other shipping containers have used fabric to close an open side. For example, the cargo container illustrated in U.S. Pat. No. 5,395,682 has a fabric wall that closes one side of the container. Containers that have fabric walls suspended from stiff frames, such as laundry hampers, are also well known, as shown, for example, in U.S. Pat. Nos. 3,233,644 and 3,358,725, or aircraft cargo containers as shown in U.S. Pat. No. 5,941,405.

Clearly, a shipping container's walls must not have any openings larger than the smallest item to be contained within. In addition there may be goods that require shipping in a closed container where air circulation is helpful. For example, baked goods, fruit, and fresh flowers may benefit from having air circulate, but insects and rodents should be excluded. Other goods have other ventilation requirements. Accordingly, there is a need for a lightweight shipping container that is collapsible, light weight, folds to a compact shape and yet also has sidewalls that keep small items in and allows control of air circulation through the container.

SUMMARY OF THE INVENTION

The present invention teaches how to make an injection molded shipping container with walls that form frames with bracing sufficient to make the container rigid and with openings between the frames covered with a fabric panel that is insert molded when the container is manufactured. The shipping container is lightweight and may have hinges allowing it to fold compactly for return shipping.

The fabric panels may be tightly woven, essentially impermeable, or they may be loosely woven to allow air circulation. Molding the frames with a fabric insert in the mold causes the thermoplastic of which the frames are made to intimately bind and permeate the fabric where the fabric and framework meet. Accordingly, the fabric panel is essentially permanently bonded to the framework. Depending on material selection, the injection molding process may also cause a quasi-chemical bond as some of the hot thermoplastic frame material diffuses into the fabric.

DESCRIPTION OF THE INVENTION

Figure 1:
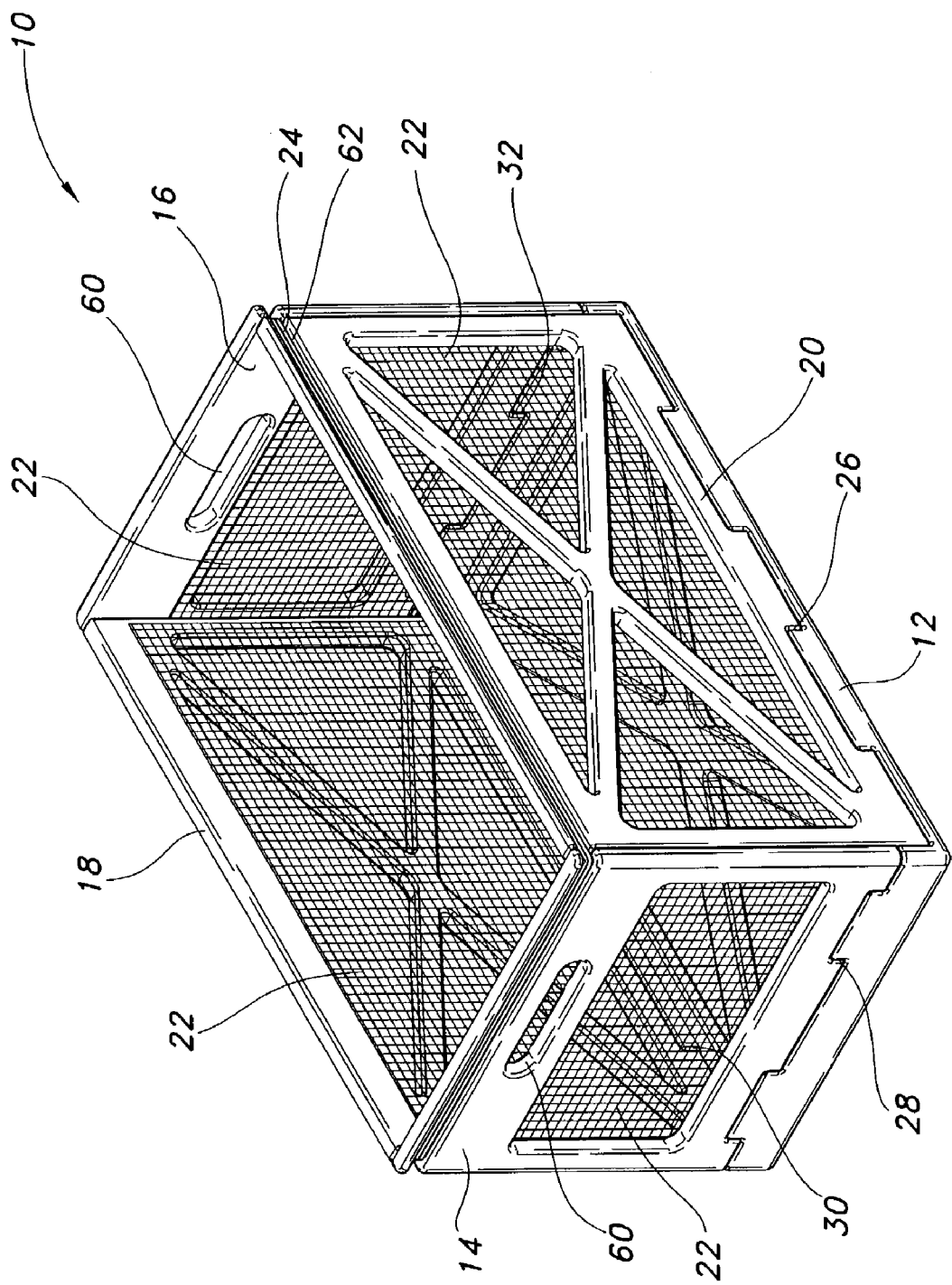
FIG. 1 is a perspective illustration of a shipping container constructed following the precepts of the present invention shown in the erect condition.

A shipping container 10 constructed following the teachings of the present invention has a bottom 12, two end walls 14, 16 and two sidewalls 18, 20 each of which may include a fabric panel, e.g., 22, that is insert molded in place. The sidewalls 18, 20 and end walls 14, 16 are hinged to the bottom 12. A removable band 24 around the top edge of the side and end walls 14, 16, 18, 20 holds them in their upright position to form an open topped, rectangular container. The hinges 26, 28, 30 and 32 are arranged so that once the band 24 is removed, the shipper may be folded flat. See FIG. 2.

Figure 3:
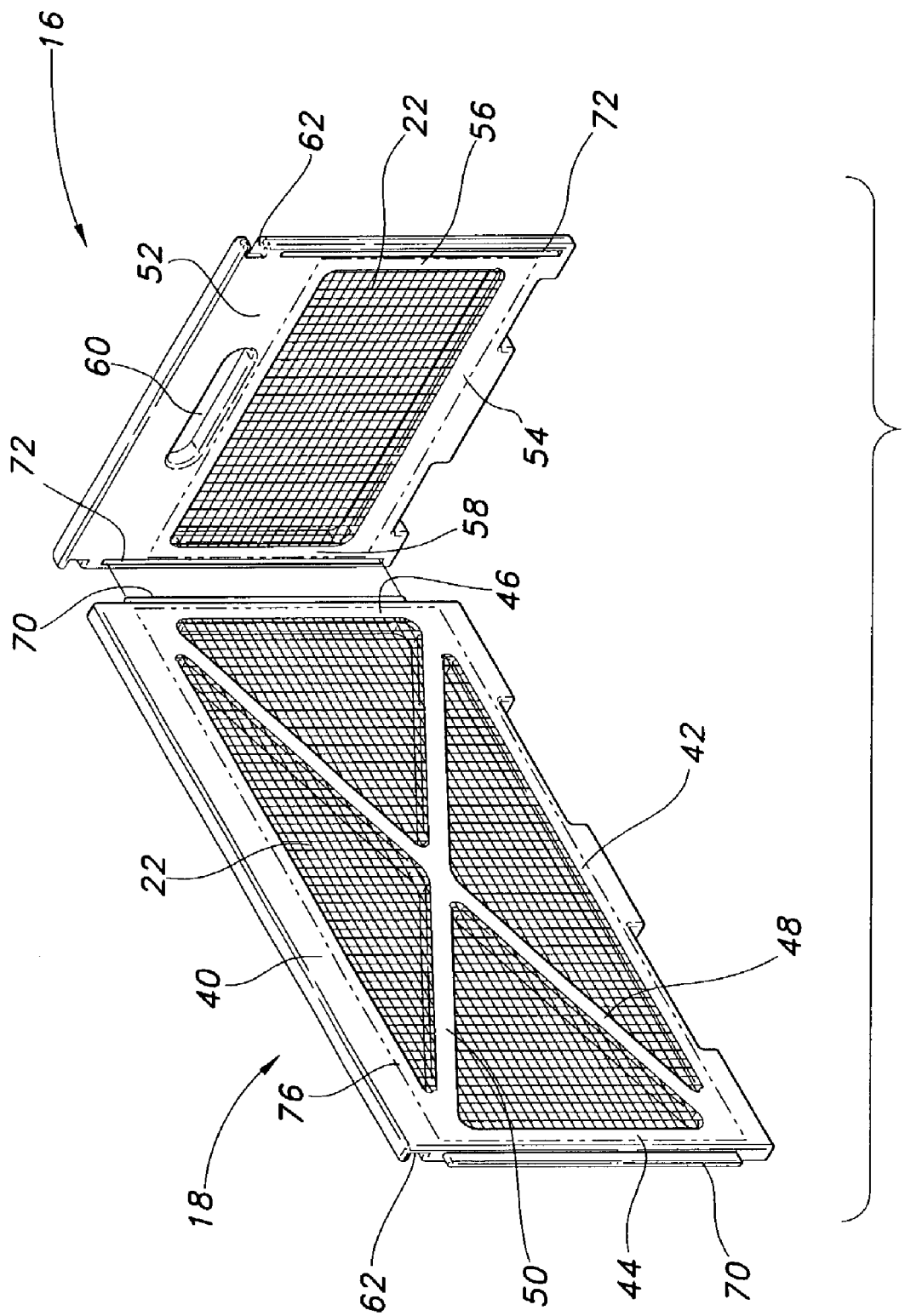
FIG. 3 is a perspective illustration of a sidewall and an end wall of the container of FIG. 1, showing a tab and slot arrangement used to keep the container erect.
Figure 4:
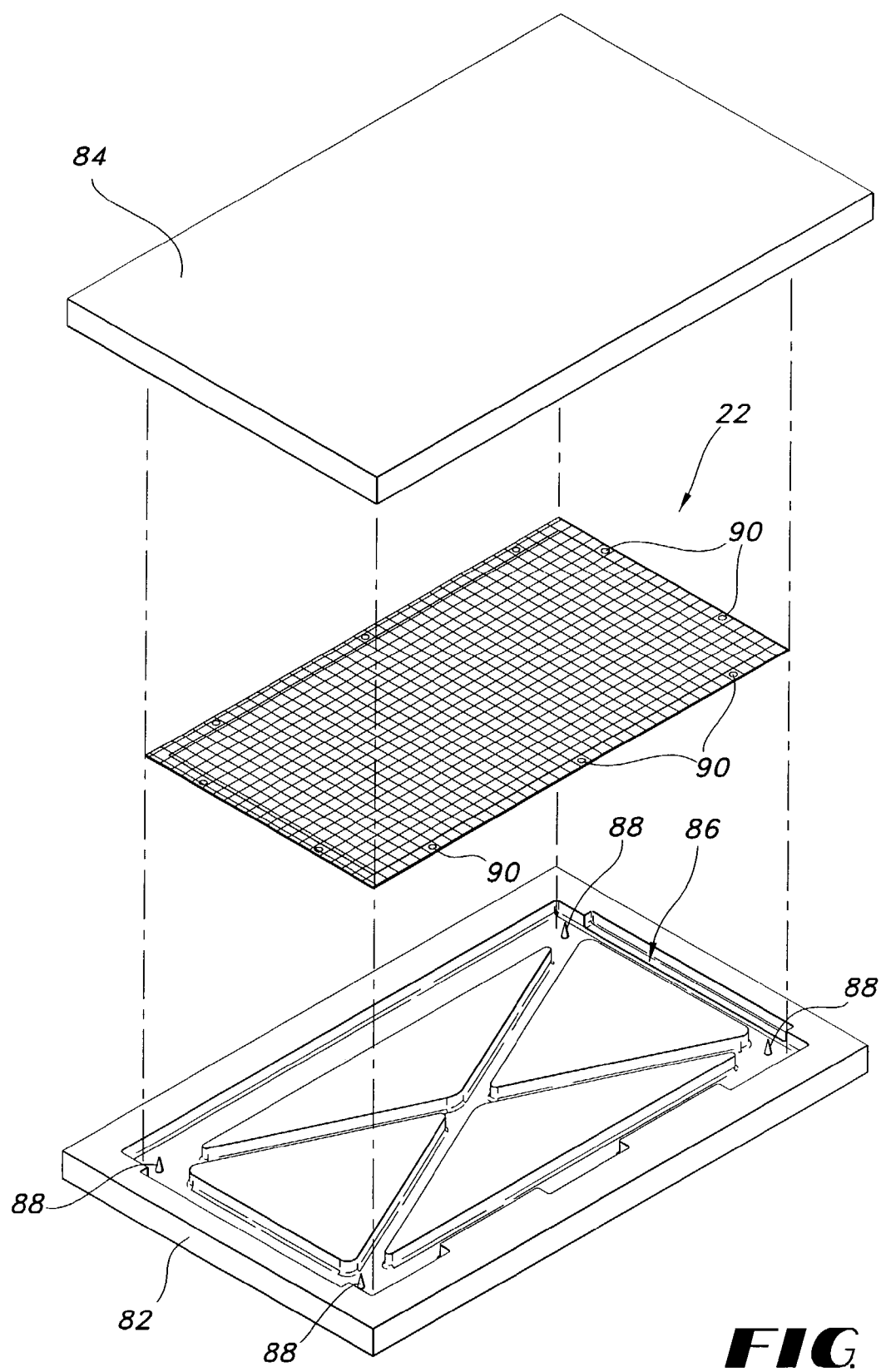
FIG. 4 is a schematic exploded view of a mold bottom half with a cavity, a fabric insert and a mold top.

The sidewalls 18, 20 (FIG. 1) are substantially identical to each other as are the end walls 14, 16, and only one of each will be described in detail. The sidewall 18 (FIG. 3) has integrally formed rails 40, 42 and stiles 44, 46 that form a peripheral, rectangular frame. Each sidewall has diagonal braces 48, 50 that form an X, extending from corner to corner of the frame. The X brace arrangement of the sidewalls is exemplary, and other arrangements of braces are possible depending upon the strength required for the particular application. For example, there may be more or fewer braces, and they may be diagonal as shown, at some other angle, or parallel to the rails and/or stiles.

The end wall 16 is also made with rails 52, 54 and stiles 56, 58 that are integrally formed and create a rectangular, peripheral frame. The top rail 52 of the end wall 16 includes openings 60 that form handholds for the container. Similar openings (not shown) may also be provided in the sidewalls. The end walls 14, 16 (FIG. 1) may also be provided with bracing (not shown), if the load to be carried and stacking requirements make additional bracing necessary.

The bottom 12 shown in FIG. 1 is similar in construction to the sidewalls and is made the same way. The bottom 12 may be made solid or with a fabric panel insert as shown, depending on the performance requirements for the shipper.

Figure 2:
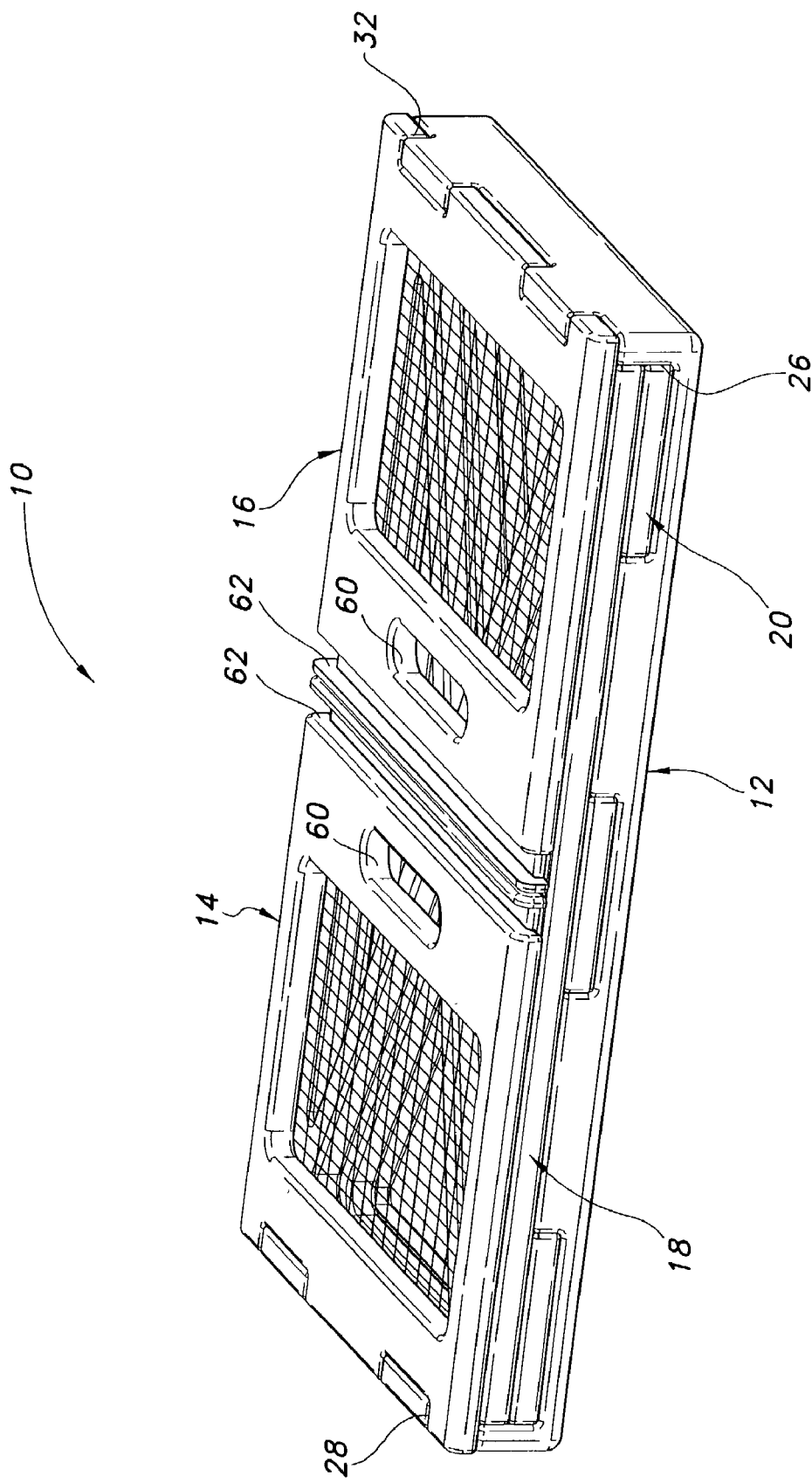
FIG. 2 is a perspective illustration of the shipping container of FIG. 1 folded flat.

As noted, the end and side walls 14, 16, 18 and 20 are connected to the bottom 12 with a hinge arrangement. The hinges 26, 30 on the bottom for the front and rear sidewalls 18, 20, respectively, are vertically staggered so that the sidewalls can fold flat in parallel but vertically offset planes as shown in FIG. 2. (This requires that one of the otherwise mirror image side walls be shorter than the other.) The hinges 28, 32 for the end walls are positioned upward from the bottom far enough that the end walls 14, 16 can lay flat on top of the two sidewalls 18, 20. The end walls 14, 16 are short enough that they meet along the centerline of the bottom when they are folded flat. Accordingly, the hinge axes of the end walls 14, 16 are coplanar.

Any known hinge arrangement may be used so long as it permits the side walls 18, 20 and end walls 14, 16 to be folded flat against the bottom 12 as described and is strong enough for the intended purpose of the shipper. The hinges may be simple dimple and recess arrangements, or they may have a conventional hinge pin. Other hinge arrangements in which one part snaps over another or engages another may also be used. It is only important that the hinges provide at least 90 degrees of rotation for the side walls and slightly more than that for the end walls. Further, instead of hinges any suitable latch mechanism or friction fit may be used to hold the side walls 18, 20 and end walls 14, 16 to the bottom 12. Such an arrangement would enable the shipping container 10 to break down into five separate pieces for return shipping.

Each of the walls 14, 16, 18, 20 has a groove 62 around its top margin shaped to receive the strap 24 or other suitable band that serves to hold the walls upright. To help hold the walls upright, the edges of the sidewalls 18, 20 have tabs 70 (FIG. 3) extending outward from them. Each tab 70 fits into a corresponding slot 72 in the rails of the end walls. To erect the shipping container 10 from the flat folded position shown in FIG. 2, the end walls 14, 16 are folded upward and out past their perpendicular position so that they extend away from the bottom 12 at an angle. The sidewalls 18, 20 are then folded upward until they are perpendicular to the bottom 12. Thereafter the end walls 14, 16 are folded back to a vertical position, bringing the slots 72 in the end walls 14, 16 into engagement with the tabs 70 extending from the sidewalls 18, 20. Once positioned in this manner, the band 24 is installed in the groove 62 and tightened to hold the walls 14, 16, 18, 20 in their upright positions. The band 24 and the means for installing and tightening it are conventional.

The walls 14, 16, 18 and 20 and bottom 12 of the shipping container 10 are formed of a thermoplastic material. Each of the walls and bottom is made with an insert molded fabric panel 22 (FIG. 1) covering the inside surface. This is accomplished by placing a panel of fabric of the appropriate size in the mold before the mold is closed to inject the plastic forming the rails and stiles of the wall (or bottom. The fabric panel 22 (FIG. 3) is sized to form a band 76 around the margin where it overlaps with the rails 40, 42 and stiles 46, 48.

Because the fabric panel 22 is present in the mold when the thermoplastic material is injected, there is an intimate mechanical bond between the fabric and the plastic. To enhance this mechanical bond, the marginal band 76 may be perforated before molding. The injected plastic material fills the openings so formed. As a result of insert molding the fabric panels in place, there are fewer nooks and crannies where the fabric and walls are joined, making the shipping container easier to clean for reuse than would be a similar shipping container with a fabric separately attached to the walls. Moreover, the fabric is essentially permanently attached to the walls, and cannot be separated from the walls without destroying either the fabric or the wall.

The fabric may be of any kind that can withstand the injection molding process. The fabric must have a sufficiently high melting point that it will not melt during the molding process, and it must have sufficient mechanical strength to withstand the flow of molten plastic within the mold. If a thermoplastic material is used for the insert, a quasi chemical bond can occur with the material forming the rails and stiles. This happens as the hot material forming the frame diffuses into the fabric material, making a particularly permanent connection between the two.

The fabric inserts 22 may be made of various polymers including but not limited to nylon, polyester, and polypropylene, natural fibers and/or coated synthetic fibers such as NOMEX and TYVEK, both available from E.I. duPont de Nemours, Inc. Some fibers, particularly natural fibers, absorb moisture and other chemicals, and may tend to rot and lack durability. However, this same characteristic may be used to advantage for example in shipping fresh flowers or produce where an insect repellant or preservative could be applied to and absorbed by the fabric. Where the container 10 must be sanitized after each use, nonabsorbent synthetic fibers may be preferred.

The walls 14, 16, 18 and 20 of the container 10 may be made of any material that can be processed by injection molding. Suitable resins include HDPE, polypropylene, nylon, ABS, polycarbonate, acetal, PVC, and PPO. The particular material chosen depends on the application and cost constraints.

The shipping container shown includes a bottom and four walls all of which have fabric panels insert molded during the manufacturing process. It should be clear that one or more of the walls or the bottom may be made without the insert and either having an open frame or having a solid plastic panel closing the wall. Variations in the size of the fabric panels may be made according to the needs of the materials to be shipped in the container. In some applications the fabric panels 22 may cover the openings for the handles 60. For example, sidewalls could have a solid lower portion and fabric panels that span the upper portion. One or more walls (or the bottom) could be made with completely solid walls, for example to allow forced ventilation in one direction only.

The shipping container has been shown with hinged walls, and this design has advantages in being able to be knocked down. However, some circumstances may require a shipper that cannot be knocked down. In that case, the shipper can be made in a integral fashion with the fabric panel inserts in one or more walls (and/or the bottom) as required. Further, the shipper need not be square. For example, the container could be made cylindrical with fabric panel inserts molded in the curved sidewall and/or bottom.

The particular properties of the fabric used may be selected according to the requirements of the goods to be shipped. The fabric can have a very wide mesh or be finally woven. The fabric may be tightly woven so as to be almost a air and water impermeable. The fabric may be woven and stiff or knitted and elastic. Alternatively, the fabric could be a non-woven fabric.

The process of making the wall 18 illustrates how the bottom 12 and the walls 14, 16, 18 and 20 are made. A conventional mold assembly includes a mold bottom 82 and a mold top 84. The mold bottom 82 includes a cavity 86 the shape of the rails 40, 42, stiles 44, 46 and braces 48, 50. The mold bottom 82 also includes pins 86 positioned around the periphery of the cavity. Four pins 88 are shown, but this exemplary and more or fewer may be used. The pins 88 are shown inside the perimeter of the cavity 86 so that the edge of the fabric is buried within the finished wall. However, they could also be located outside the cavity, and then the edges of the fabric would be exposed on the outside at the mold parting line. If located within the cavity, the pins 88 may be fixed, resulting in openings through the rails and stiles. Alternatively, the pins may be retractable so that no holes are formed.

The fabric panel insert 22 is placed over the cavity and held in place by the pins 88. Thereafter the mold top is placed on top to close the mold cavity and the plastic material for making the balance of the wall is injected in the mold in a conventional manner. Because the fabric overlaps a band around the periphery of the cavity, when the thermoplastic is injected, it penetrates the fabric. The fabric panel insert has a series of perforations 90 around its margin. When the thermoplastic resin is injected into the mold cavity, it fills the perforations 90 to enhance penetration of the resin with the fabric insert 22.

It will be understood that the mold top and bottom may be reversed and either one may hold the panel 22. The resulting wall, when joined with other walls, and a bottom forms the shipping container 10 shown in FIG. 1. It is lightweight, and easy to make and use. The fabric panels can be adapted to be virtually airtight or highly permeable or anywhere in between to suit the intended use. The container 10 is easy to setup and just as easily knocked down for return and reuse.

What is claimed is:

1. A shipping container comprising:
    a bottom, two ends walls and two side walls, wherein the end walls and side walls are connected to the bottom to form a substantially rectangular shaped container;
    wherein at least one of the end walls and side walls is connected to the bottom with a hinged arrangement;
    the bottom, comprising a frame having at least one opening through it and being made of a molded thermoplastic material; and
    an insert molded fabric panel covering the opening;
    whereby a relatively lightweight shipping container is formed.

2. The shipping container of claim 1, wherein the fabric overlaps a band around the perimeter of the frame.

3. The shipping container of claim 1, wherein the thermoplastic material penetrates the fabric panel to hold the fabric panel in place.

4. The shipping container of claim 3, wherein the thermoplastic material at least partially melts the fabric panel during the molding process.

5. The shipping container of claim 3, wherein the fabric panel is made from a material selected from the group comprising nylon, polyester, polypropylene and natural fibers.

6. The shipping container of claim 3, wherein the frame is made of a material selected from the group including HDPE, polypropylene, nylon, ABS, polycarbonate, acetal, PVC, and PPO.

7. The shipping container of claim 5, wherein the frame is made of a material selected from the group including HDPE, polypropylene, nylon, ABS, polycarbonate, acetal and PPO.

8. A lightweight shipping container comprising four walls having hinged connections to a base, at least one of the walls having a frame bounding the periphery of the wall and providing structural integrity, the frame having an opening within the periphery and a fabric covering the opening, the frame being made of a thermoplastic material that is injection molded to surround and bind a peripheral band of the fabric to secure the fabric to the frame; and
    the walls having an erect condition wherein they together with the base define a generally rectangular, open topped container and a knocked down condition in which the walls are folded flat on top of each other and the base.

9. The shipping container of claim 1, wherein each of the end walls and side walls is connected to the bottom with a hinged arrangement.

10. The shipping container of claim 1, wherein at least one of the end walls or side walls comprises a frame having at least one opening through it and being made of a molded thermoplastic material and an insert molded fabric panel covering the opening.

* * * * *